(No Model.) 2 Sheets—Sheet 1.
W. S. RICHARDS.
SYSTEM OF ELECTRICAL DISTRIBUTION.
No. 440,326. Patented Nov. 11, 1890.
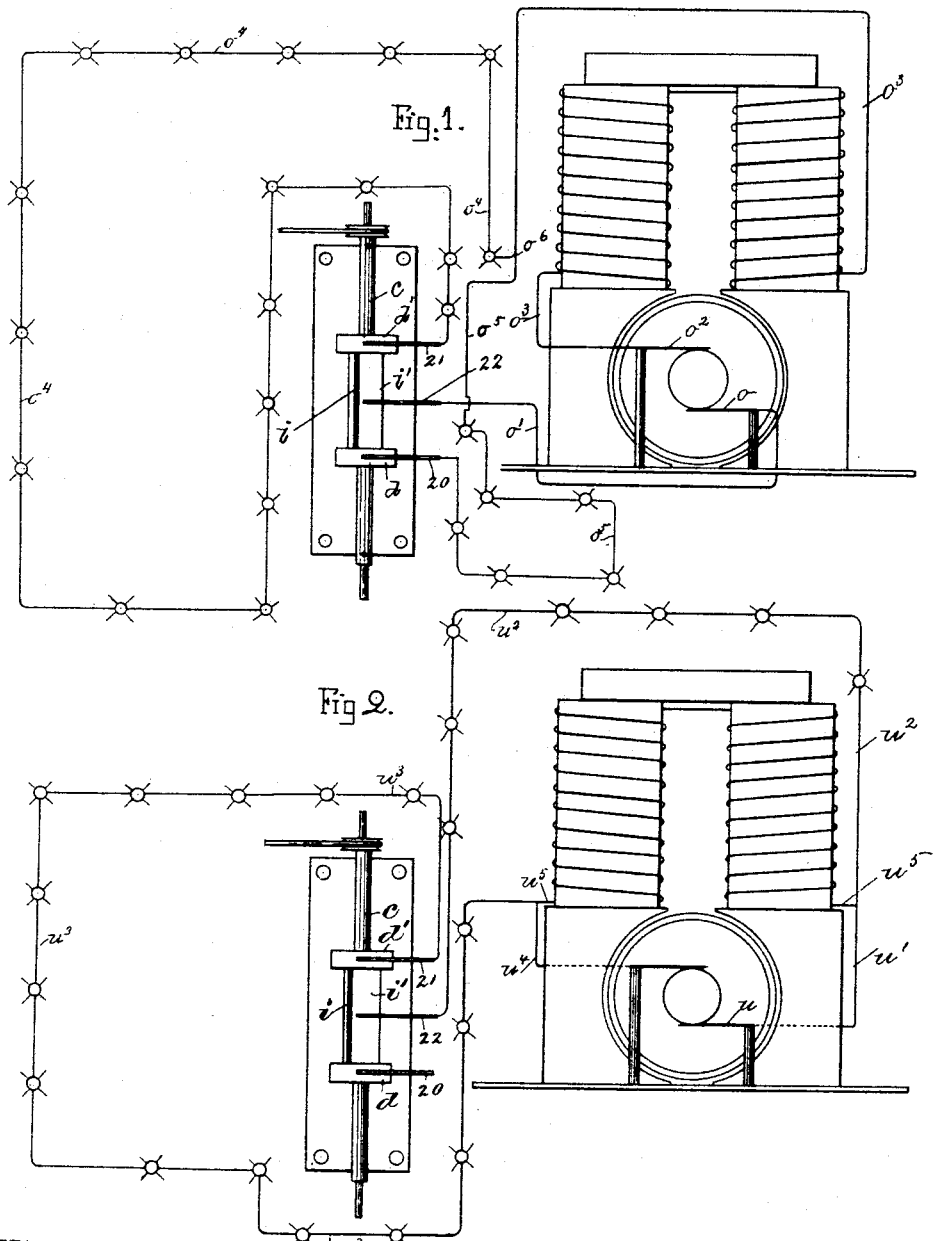
Witnesses.
Fred. F. Greenleaf
Frederick L. Emery
Inventor.
Walter S. Richards,
By Crosby & Gregory
Attys (No Model.) 2 Sheets—Sheet 2.

W. S. RICHARDS.
SYSTEM OF ELECTRICAL DISTRIBUTION.

No. 440,326. Patented Nov. 11, 1890.

Witnesses.
Fred S. Greenleaf
Frederick L. Emery

Inventor
Walter S. Richards,
by Crosby Gregory
attys.

THE NORRIS PETERS CO., PHOTO-LITHO., WASHINGTON, D. C.

UNITED STATES PATENT OFFICE.

WALTER S. RICHARDS, OF NATICK, ASSIGNOR OF ONE-HALF TO GEORGE B. JAMES, OF BOSTON, MASSACHUSETTS.

SYSTEM OF ELECTRICAL DISTRIBUTION.

SPECIFICATION forming part of Letters Patent No. 440,326, dated November 11, 1890.

Application filed May 2, 1890. Serial No. 350,284. (No model.)

*To all whom it may concern:*

Be it known that I, WALTER S. RICHARDS, of Natick, county of Middlesex, State of Massachusetts, have invented an Improvement in Systems of Electrical Distribution, of which the following description, in connection with the accompanying drawings, is a specification, like letters on the drawings representing like parts.

This invention has for its object to construct and arrange a system of electrical distribution whereby a working or consumption circuit of full capacity may be maintained and at the same time the power or output of the dynamo materially increased.

In carrying out this invention I employ two or more loops, and I provide a current director or switch which is rotated or moved rapidly to direct the current from the dynamo or other equivalent generator over first one and then another loop. If two loops only are employed, the current will be alternately directed over these loops, so that each loop shall receive substantially the entire current. In one of these loops I include the coils of the field-magnets of the dynamo, and the other loops, whether I employ one, two, or more, are employed for lighting or other purposes. The loop which includes the coils of the field-magnets may be connected in series or in shunt. When connected in series, the current is directed through it by a current director or switch constructed and arranged to change its course, and when connected in shunt the current-director will simply open the other loop or loops and thereby allow the entire current to pass over it. If the current should be too heavy for the field-magnets, any suitable resistance may be included in this loop, which may be adjusted at will or automatically, such forms of resistance being common.

Figure 3:
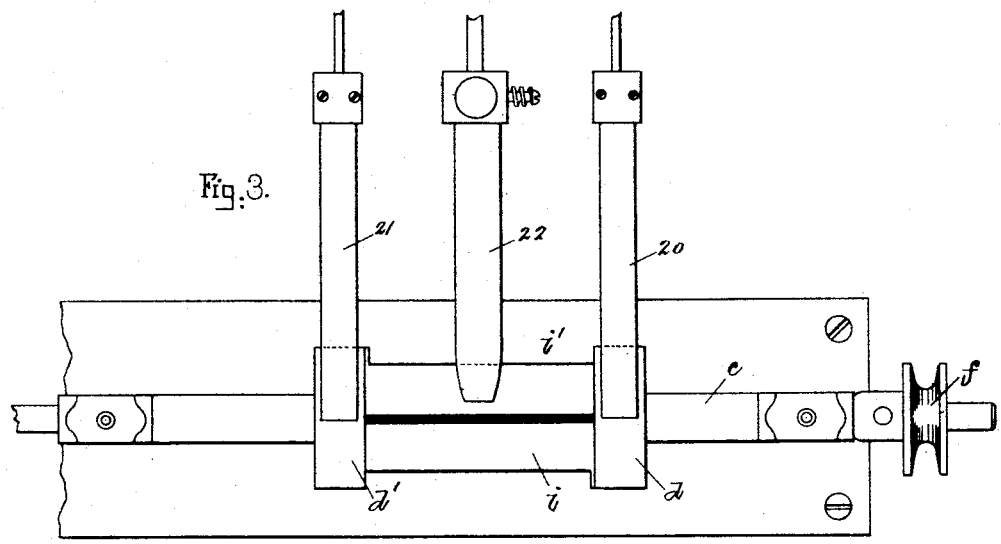
Figure 4:
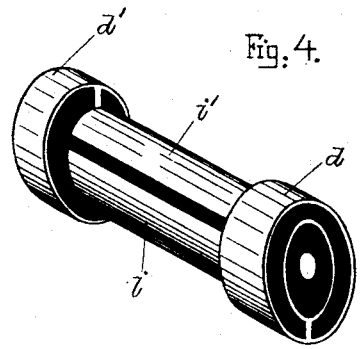

Figure 1 represents in diagram a system of electrical distribution comprehending my invention, the coils of the field-magnets being connected in series; Fig. 2, a similar view, the coils of the field-magnets being arranged in shunt; Fig. 3, a plan view of the current-directors which may be employed to carry out this invention; Fig. 4, a perspective view of the cylinder of the current-director shown in Fig. 3.

The current-director herein represented is substantially the same as shown and described in my application, Serial No. 344,381, filed March 18, 1890, although in so far as my present invention consists any other form or construction of current-director may be employed.

The current-director herein shown consists of a shaft $c$, bearing conducting-plates $d$ $d'$, arranged on disks of insulating material, and contact-pens 20 21, contacting therewith, and a cylinder or disk of insulating material bearing two conducting-plates $i$ $i'$, said plates being separated one from the other. The conducting-plate $i$ is connected with the conducting-plate $d$, and the conducting-plate $i'$ is connected with the conducting-plate $d'$. A contact-pen 22 bears on the conducting-plate $i$ or $i'$ as the cylinder is rotated. A belt-pulley $f$ is secured to the shaft $c$, and by a belt thereon the said shaft is revolved.

Referring to Fig. 1, a dynamo of any suitable form is shown. From the terminal or contact-brush $o$ of the dynamo a wire $o'$ leads to the contact-pen 22 of the current-director. From the contact-brush $o^2$ of the dynamo a wire $o^3$ leads to the point $o^6$, this wire including the coils of the field-magnets, and from said point $o^6$ a wire $o^5$ leads to the contact-pen 20 of the current-director. A wire $o^4$ leads from the wire $o^3$ at the point $o^6$ to the contact-pen 21 of the current-director. As the current-director is herein shown, the current will pass over the wire $o'$, contact-pen 22, conducting-plate $i'$, conducting-plate $d'$, pen 21, wire $o^4$, wire $o^3$ to terminal, pen or brush $o^2$, thus directing all the current through the loop $o^4$ and the coils of the field-magnets. When the shaft $c$ is partially rotated, the current will then pass over the wire $o'$, contact-pen 22, conducting-plate $i$, conducting-plate $d$, contact-pen 20, wire $o^5$, wire $o^3$ to the terminal or brush $o^2$. Thus all the current will pass over the wire $o^3$ or wire $o^5$ and the coils of the field-magnets. The wire $o^4$, as herein shown, is employed as a working-circuit, it containing electric lights, motors, or other electrical devices, the wire $o^3$, the coils of the field-magnets, and over this working-circuit $o^4$ the entire current is intermittingly directed to the electric lights or other devices, which thereby receive an intermittent impulse. The wire $o^5$, as herein shown, is employed as a separate working-circuit, it including any suitable resistance in case the current is too heavy for the field-magnets, and for such resistance several lights or other electrical devices; but a less number than that shown in the wire $o^4$ are employed and the wire $o^3$, as before stated, including the coils of the field-magnets. In this instance of my invention the field-magnets are included in the circuit all the time.

Referring to Fig. 2, the coils of the field-magnets are arranged in shunt and the current passes over the brush $u$, wire $u'$, wire $u^2$, pen 22, conducting-plate $i'$, conducting-plate $d'$, pen 21, wire $u^3$, and wire $u^4$. When the shaft $c$ of the current-director is partially turned and the loop $u^2$ $u^3$ is opened, the entire current passes over the wire $u'$, wire $u^5$, and the wire $u^4$, the wire $u^5$ including the coils of the field-magnets. Thus it will be seen that the current is first directed over the wire $u^2$ $u^3$ and then over the wire $u^5$, the former constituting a working-circuit which will include electric lights or other electric devices, shunting out the field-magnets, and the other including the field-magnets.

I do not desire to limit my invention to any particular electrical device which may be connected in the working-circuits, nor to the number of working-circuits. In both instances referred to, Figs. 1 and 2, the current for the working-circuit containing the lights is intermittent, and during the cessations of the current for a fraction of a second in this working-circuit substantially the entire current is utilized to charge the field-magnets, thereby increasing the magnetism, and consequently generating a heavier current in the armature.

I claim—

1. In a system of electrical distribution, a dynamo or equivalent generator, two circuits, and a current-director, one of which circuits includes the coils of the field-magnets of the dynamo and the other translating devices, substantially as described.

2. In a system of electrical distribution, a dynamo or equivalent generator, two circuits, and a current-director, both of which include the coils of the field-magnets of the dynamo, one of said circuits also including translating devices, substantially as described.

In testimony whereof I have signed my name to this specification in the presence of two subscribing witnesses.

WALTER S. RICHARDS.

Witnesses:
BERNICE J. NOYES,
EMMA J. BENNETT.